(12) United States Patent
McGolden

(10) Patent No.: US 12,371,621 B2
(45) Date of Patent: *Jul. 29, 2025

(54) METHOD AND SYSTEM FOR GASIFICATION OF BIOMASS

(71) Applicant: McGolden, LLC, Evansville, IN (US)

(72) Inventor: Michael McGolden, Evansville, IN (US)

(73) Assignee: McGolden, LLC, Evansville, IN (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/126,563

(22) Filed: Mar. 27, 2023

(65) Prior Publication Data

US 2023/0348789 A1  Nov. 2, 2023

Related U.S. Application Data

(63) Continuation of application No. 14/356,977, filed as application No. PCT/US2013/024870 on Feb. 6, 2013, now Pat. No. 11,613,705.

(Continued)

(51) Int. Cl.
| | |
|---|---|
| C10B 57/10 | (2006.01) |
| C05F 11/00 | (2006.01) |
| C10B 49/04 | (2006.01) |
| C10B 53/00 | (2006.01) |
| C10J 3/30 | (2006.01) |
| C10J 3/72 | (2006.01) |

(Continued)

(52) U.S. Cl.
CPC .............. *C10B 57/10* (2013.01); *C05F 11/00* (2013.01); *C10B 49/04* (2013.01); *C10B 53/00* (2013.01); *C10J 3/30* (2013.01); *C10J 3/723* (2013.01); *C10L 5/42* (2013.01); *F23G 5/027* (2013.01); *F23J 1/02* (2013.01); *C10J 2200/152* (2013.01); *C10J 2200/158* (2013.01); *C10J 2300/0909* (2013.01); *C10J 2300/0916* (2013.01); *C10J 2300/0956* (2013.01); *F23G 2201/40* (2013.01); *Y02E 50/10* (2013.01); *Y02E 50/30* (2013.01); *Y02P 20/145* (2015.11)

(58) Field of Classification Search
CPC .......... C10B 49/04; C10B 57/10; C10J 3/726; C10J 2300/0909; C10J 2300/0916; F23G 5/027; F23G 2201/40; C10L 5/42
See application file for complete search history.

(56) References Cited

U.S. PATENT DOCUMENTS

| | | |
|---|---|---|
| 4,123,332 A | 10/1978 | Rotter |
| 4,764,185 A | 8/1988 | Mayer |

(Continued)

FOREIGN PATENT DOCUMENTS

| | | |
|---|---|---|
| CH | 703513 B1 | 9/2014 |
| CN | 101245250 A | 8/2008 |

(Continued)

OTHER PUBLICATIONS

Chinese Office Action Search Report dated May 20, 2016.

(Continued)

*Primary Examiner* — Patrick Orme
(74) *Attorney, Agent, or Firm* — Ryan T. Grace; Advent, LLP

(57) ABSTRACT

A continuous system for gasification of a biomass feedstock comprising: a fuel conditioning zone, a gasification zone and a char cooling area.

15 Claims, 2 Drawing Sheets

Related U.S. Application Data

(60) Provisional application No. 61/755,493, filed on Jan. 23, 2013, provisional application No. 61/595,253, filed on Feb. 6, 2012.

(51) Int. Cl.
*C10L 5/42* (2006.01)
*F23G 5/027* (2006.01)
*F23J 1/02* (2006.01)

(56) References Cited

U.S. PATENT DOCUMENTS

| | | | |
|---|---|---|---|
| 4,908,104 | A | 3/1990 | Loomans et al. |
| 5,024,820 | A | 6/1991 | Coutiere |
| 5,094,669 | A | 3/1992 | Herbert et al. |
| 5,096,463 | A | 3/1992 | Beierle et al. |
| 5,151,159 | A | 9/1992 | Wolfe et al. |
| 5,589,599 | A | 12/1996 | McMullen et al. |
| 5,601,692 | A | 2/1997 | Rinker et al. |
| 5,720,165 | A | 2/1998 | Rizzie et al. |
| 6,485,296 | B1 | 11/2002 | Bender et al. |
| 6,619,214 | B2 | 9/2003 | Walker |
| 6,754,978 | B1 | 6/2004 | Adams et al. |
| 7,832,343 | B2 | 11/2010 | Walker et al. |
| 8,328,993 | B2 | 12/2012 | Feerer et al. |
| 8,419,902 | B2 | 4/2013 | Feerer et al. |
| 8,669,404 | B2 | 3/2014 | Shulenberger et al. |
| 9,724,844 | B1 | 8/2017 | Kowalczyk |
| 11,613,705 | B2 * | 3/2023 | McGolden ............ F23G 5/027 202/150 |
| 2004/0107638 | A1 | 6/2004 | Graham et al. |
| 2007/0186829 | A1 | 8/2007 | Cole et al. |
| 2008/0209807 | A1 | 9/2008 | Tsangaris et al. |
| 2009/0007484 | A1 | 1/2009 | Smith |
| 2010/0101141 | A1 | 4/2010 | Shulenberger et al. |
| 2010/0223846 | A1 | 9/2010 | Yang et al. |
| 2011/0114144 | A1 | 5/2011 | Green et al. |
| 2011/0232191 | A1 | 9/2011 | Diebold et al. |
| 2011/0258914 | A1 | 10/2011 | Banasiak et al. |
| 2013/0098750 | A1 | 4/2013 | Nickerson et al. |

FOREIGN PATENT DOCUMENTS

| | | |
|---|---|---|
| CN | 201348276 Y | 11/2009 |
| CN | 101781585 A | 7/2010 |
| CN | 201952404 U | 8/2011 |
| CN | 201999893 U | 10/2011 |
| EP | 1312662 A2 | 5/2003 |
| JP | 2006083293 A | 3/2006 |
| JP | 2006335956 A | 12/2006 |
| JP | 2014005110 A | 1/2014 |
| WO | 2009020442 A1 | 2/2009 |
| WO | 2009124359 A1 | 10/2009 |
| WO | 2010128055 A1 | 11/2010 |
| WO | 2013126211 A1 | 8/2013 |

OTHER PUBLICATIONS

Extended European Search Report for Patent Application No. 13751926.0, dated Aug. 20, 2015.
International Search Report and Written Opinion for Application No. PCT/US2013/024870, dated Jun. 2, 2013.
Office Action in China for Patent Application No. 201380008372.2 dated Sep. 25, 2015.
Office Action in Europe for Application No. 13751926.0, dated Mar. 2, 2017.
International Search Report and Written Opinion from PCT/US2023/033250, dated Jan. 16, 2024.
Third Office Action in China for Patent Application No. 201380008372.2, dated Nov. 9, 2016.

* cited by examiner

METHOD AND SYSTEM FOR GASIFICATION OF BIOMASS

BACKGROUND

There have been a number of challenges when dealing with oxygen starved gasification that evolved around the material handling and crusting or agglomerate formation in certain reaction zones of the gasifier design. Conventional gasification units have had limited success with high ash materials as they tend to form agglomerate (crusting or clinker formation) at lower temperatures than traditional woody biomass systems. Biochar is the ash byproduct of the gasification process. While ash has been used as a fertilizer for many years the benefits of leaving carbon in the ash has only recently been established.

Accordingly, there is a need for a system and method of producing energy from biomass that is designed to address these operational issues as well as produce a marketable "BioChar". There is a further need for a biomass gasification system useable with high ash feedstocks.

DETAILED DESCRIPTION

The general principle is that, by controlling the air and biomass movement through the unit, higher or lower levels of carbon in the ash may be developed and maximize the ash's value as both a fertilizer and/or method of holding carbon in the soil for long periods of time.

The present system is particularly well suited for on-site heat production as part of larger facility. However, it is conceivable that the present system could be used to utilize high ash biomass as an energy source for electricity production.

Figure 1:
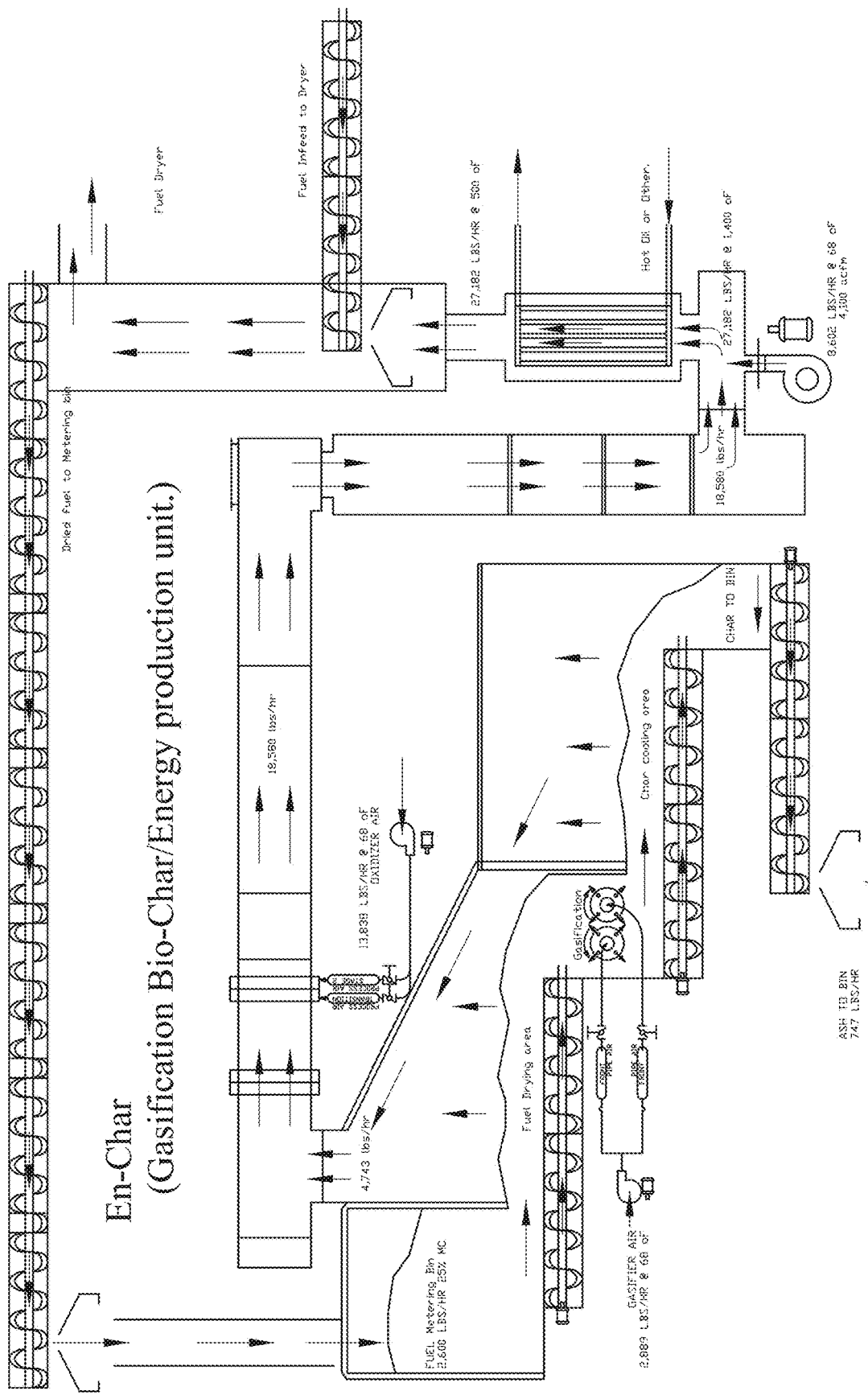
FIG. 1. is a schematic view of a biomass gasification system for use with high ash feedstocks.

Referring to FIG. 1, fuel is introduced to a dryer. While generally any biomass material may be used, the present system is most advantageous in its handling of high ash feedstocks such as animal manure.

Biomass fuel generally contains large amounts of moisture. There are a number of methods for removing the moisture. In some embodiments, a commercial dryer may be added to the system. This will not be required with all biomass fuels. Standard equipment would also be used to introduce material to the front end of the gasification process.

After conditioning of the fuel it may be introduced and moved with augers through the various zones. The speed of these augers is controlled so that the material is being taken away at the same speed that it is introduced. This not only produces a continuous process but also allows for fine control of the rate and extent of reaction. With this process, the amount of the fixed carbon that will be left in the char may be adjusted by varying the feedstock feed rate as well as the feed rates of air as it is added in different zones of the process.

Figure 2:
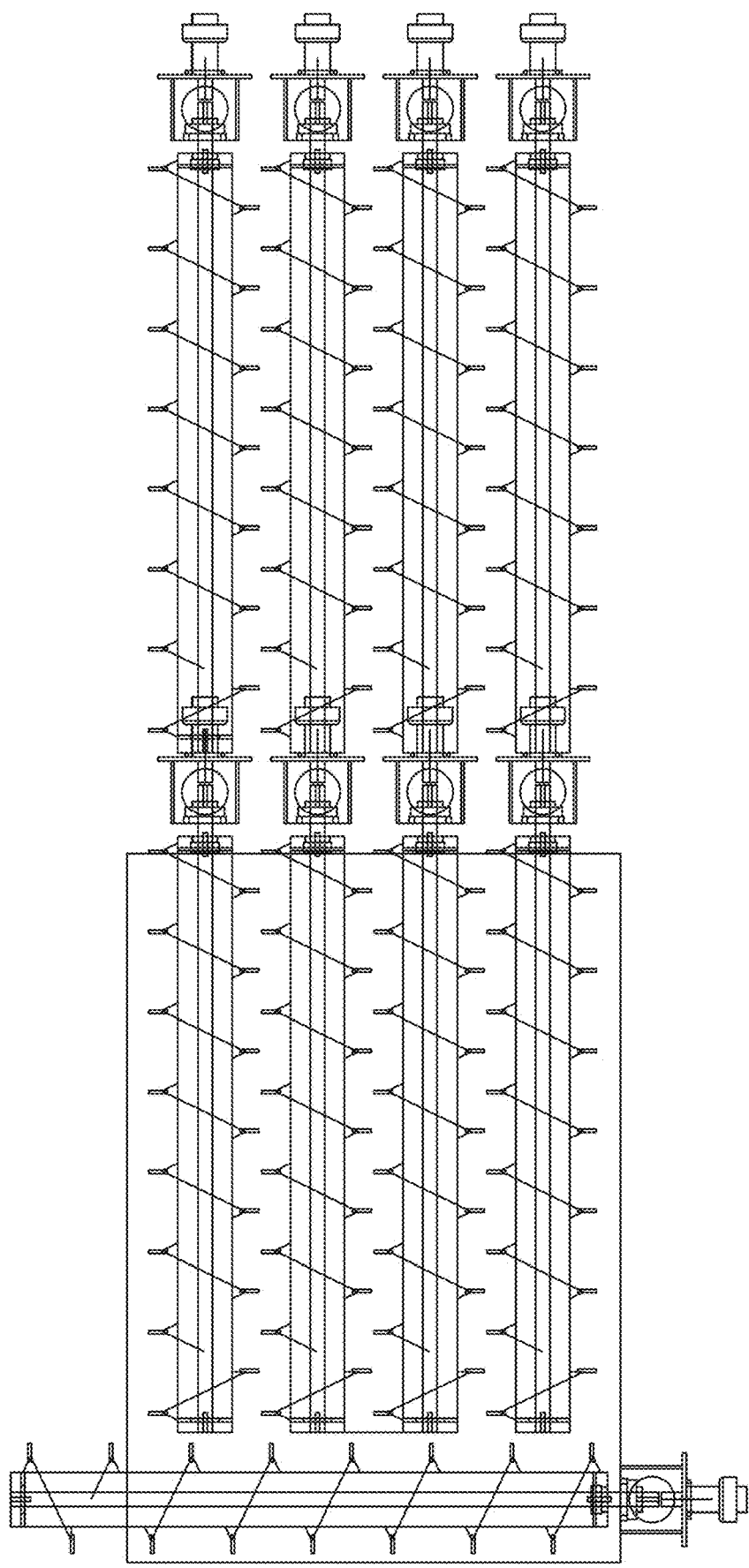
FIG. 2 is a top view of auger system for controlling the movement of biomass through the gasification system.

The augers (as shown in FIG. 2) lie side by side forming a live floor that moves material evenly across the length and width of the unit. A char removal auger is also shown running transverse to the direction of the other augers. The fuel and char may be maintained at levels to prevent excess air from entering the unit.

There are two different methods of introducing air to the "reaction zone". In this zone a portion of the volatile carbon material and possibly some of the fixed carbon are oxidized to produce enough heat to drive off the volatiles in the rest of the biomass material. In some embodiments, approximately ¼ of the air required for complete oxidation is introduced into this zone, however, this amount may vary depending on conditions and biomass.

Air can be introduced with stationary multiple inlet points or by using a rotary air delivery system. Testing has shown that by keeping the air and biomass fuel moving, high temperature zones (hotspots) can be avoided and reduce or eliminate crusting and/or agglomerate formation. A rotary air system may ensure that material can pass through this zone without problems. The combination of moving air and the disturbance to the biomass material around the "disc" design shown will continuously bring new material into and through the reaction zone. Keeping the air and biomass fuel moving will generate considerable heat energy and a producer gas with high levels of CO and H2 with other volatile compounds. This producer gas can then be used for various applications such as being fired in a low BTU combustion engine or turbine. Alternatively, the producer gas may be oxidized in a second chamber to produce a high temperature oxidized flue gas for use in downstream equipment such as boilers or hot oil heat exchangers.

The producer gas passes up over the fuel and is combined with the volatiles from the char cooling area as well as the drying and conditioning areas of the gasifier. This process will transfer some of the heat down through the fuel being introduced and help with the drying of the material before it reaches the air in the reaction zone. The resulting gas from the total process will then go to a second chamber where the rest of the air required for complete oxidation is added or the gas could be cleaned for other applications. Alternative processes could include the catalytic oxidation of all or a portion of the producer gas.

In an exemplary embodiment, the producer gas from the unit will generally be in the 400 to 600 C. range and contain levels of CO, CO4, and H2 as well as other compounds. When oxidized in the upper chamber the resulting flue gas may typically be in the 1200 C. range. This flue gas can then be used for other energy applications.

The resulting char is removed from the unit. A level of char is maintained in the unit to prevent air from entering into the reaction area. The quantitative qualities of the char can be adjusted to meet market demands by speeding up the flow or slowing it down, or adjusting the amount of air introduced into the various regions. When the char is cooled, relatively high levels of CO may be released. This will pass up over the gasifier reacting area as well as the fuel conditioning area to be added to the producer gas going to the oxidizer.

All aspects of the system may be controlled by a programmable logic controller. Feed back loops may be established based on gas and char temperatures at various points in the process. Automated adjustments may be made to the dwell time of the fuel in various zones of the process or in the amount of air introduced to maintain a consistent biochar.

EXAMPLES

In the following examples, a new gasification technology was used to integrate farm wastes into fertilizer and energy.

A carbon rich product called biochar is generated from this process. Biochar is mainly produced from the pyrolysis of crop and animal manure. Biochar is understood to be a valuable material for its improving stability in soil and nutrient retention properties, which could be beneficial for the environment and in certain agricultural applications.

Five biochar samples (summarized in Table 1) produced using the methods described herein were tested.

TABLE 1

Samples

| Sample ID | Description | Location |
|---|---|---|
| 6077 | Frye Poultry-broiler manure | Wardensville, WV |
| 6078 | P&J-Turkey litter | Northfield, MN |
| 6079 | Egg layer manure without Carbon | Carterville, IL |
| 6080 | Egg layer manure with Carbon | Carterville, IL |
| 6082 | Horse muck | Carterville, IL |

The samples were investigated for the chemical and mineral content and mineral release capacity by X-Ray Fluorescence Spectroscopy (XRF), X-Ray Di-fraction Spectroscopy (XRD). Carbon-Sulfur Analyzer, Inductively Couple Plasma Spectroscopy (ICP) and Phosphate Analyzer.

Elemental data were obtained from XRF with a universal method: however this is not a calibrated method. Therefore the data presented in Table 2 should be considered semi quantitative except for the sulfur and carbon data shown in first two rows. Both carbon and sulfur data were obtained from Leco C-S Analyzer. Calcium, Potassium and Phosphorus are the dominant elements detected through out the samples. The table below list the major components detected, for the full list of elements detected please refer to the appendix.

TABLE 2

Elemental analysis of Biochar samples

| % | 6077 Frye | 6078 P&J | 6079 No C | 6080 With C | 6082 Horse muck |
|---|---|---|---|---|---|
| Sulfur | 1.75 | 1.4 | 0.41 | 0.62 | 0.18 |
| Carbon | 21.9 | 9.52 | 3.45 | 7.9 | 15.4 |
| Calcium | 16.8 | 21.7 | 54.4 | 35.2 | 35.8 |
| Silicon | 2.3 | 3.51 | 0.6 | 5.5 | 8.4 |
| Phosphorus | 7.1 | 9.9 | 3.8 | 4.9 | 3.7 |
| Potassium | 16.2 | 13.2 | 5.5 | 4.7 | 5.8 |
| Aluminum | 1.6 | 0.9 | 0.2 | 2 | 2.3 |
| Magnesium | 3.5 | 4.4 | 1.6 | 2.3 | 2 |
| Sodium | 2.7 | — | — | — | — |
| Iron | 2.1 | 1.3 | 0.9 | 5.7 | 2 |
| Chloride | 5.7 | — | — | — | — |

TABLE 3 summarizes the chemical composition of minerals determined by XRD. The Biochar from Frye-broiler manure shows some variability in the chemical composition compared to the rest of the samples. Potassium sodium calcium phosphate, sylvite, quartz, and calcite are the most common minerals found within all of the Biochar samples.

| % | 6077 Frye | 6078 P&J | 6079 PT no C | 6080 PT with C | 6082 Horse muck |
|---|---|---|---|---|---|
| Sulfur, S | 1.75 | 1.4 | 0.41 | 0.62 | 0.18 |
| Carbon, C | 21.9 | 9.52 | 3.45 | 7.9 | 15.4 |
| Apthitalite, $K_3Na(SO_4)_2$ | 24.9 | — | — | — | — |
| Whitlockite, $HCa_9Mg(PO_4)_7$ | 17.8 | — | — | — | — |
| Sylvite, KCl | 16.4 | 4.5 | 3.3 | 3.2 | 1.9 |
| Quartz, $SiO_2$ | 6.3 | 5.2 | 4.33 | 6.8 | 56.6 |
| Calcite, $CaCO_3$ | 5.7 | 4.5 | 18.6 | 6.8 | 14.4 |
| Ammonium potassium Sulfate, $NH_4KSO_4$ | 4.6 | — | — | — | — |
| Hematite, $Fe_2O_3$ | 3.8 | — | — | — | — |
| Potassium sodium calcium phosphate, $KNaCa_2(PO)_4$ | — | 38 | 28.5 | 30.4 | 16.8 |
| Potassium calcium magnesium phosphate, $CaMgK(PO_4)_7$ | — | 21.8 | — | — | — |
| Hydroxylapatite, $Ca_{10}(PO_4)_6 \cdot H_2O$ | — | 17.6 | 16.4 | 18.7 | 7.8. |
| Portlandite, $Ca(OH)_2$ | — | — | 28.3 | 10.2 | 1.9 |
| Periclase, MgO | — | — | 3.8 | 4.3 | — |
| Lime, CaO | — | — | — | 12.5 | 0.6 |
| Others, amorphous | 20.4 | 8.5 | — | 7.1 | — |

Among the biochar samples, the Frye broiler manure showed the highest carbon content. Therefore this sample was selected for the leachability study (TCLP: Toxicity Characteristic Leaching Procedure) and further processed through a lab oxidation process to remove the carbon. The ash obtained from oxidation was compared to the original sample by MLR. The TCLP samples were prepared under neutral conditions to have a true comparison to leachability in the field. This experiment was conducted to compare straight oxidation of the manure rather than gasification where retained carbon may aid in the slow release of the fertilizer into the plant and the environment. The results of leachable metals, total nitrogen, phosphorus, total sulfur and carbon in neutral water leachate were shown in Table 4.

| | 6077 Frye | 6077 Lab Gasified Frye |
|---|---|---|
| Sulfur (%) | 1.75 | 4.05 |
| Carbon (%) | 21.9 | 0.11 |
| TCLP data: in neutral water | mg/L | mg/L |
| Total Nitrogen by TKN | 6.5 | 6.1 |
| Phosphorous | 3.9 | 9.2 |
| Silver | — | — |
| Aluminum | 0.42 | 0.72 |
| Arsenic | 0.26 | 0.1 |
| Boron | 1.4 | 2.5 |
| Barium | 0.01 | 0.17 |
| Beryllium | — | — |
| Calcium | 35 | 9 |
| Cadmium | — | — |
| Cobalt | 0.031 | — |
| Chromium | 0.079 | 0.84 |
| Copper | 3.6 | — |
| Iron | 0.37 | — |
| Potassium | >900 | >900 |
| Lithium | 0.02 | 0.35 |
| Magnesium | 78 | 4 |

-continued

| | | |
|---|---|---|
| Manganese | 0.079 | — |
| Molybdenum | 0.85 | 2.7 |
| Sodium | 430 | >900 |
| Nickel | 0.093 | — |
| Lead | — | — |
| Antimony | 0.01 | 0.011 |
| Selenium | 0.045 | 0.09 |
| Silicon | 1.8 | 2.3 |
| Tin | — | — |
| Strontium | 0.062 | 0.076 |
| Titanium | — | — |
| Thallium | — | — |
| Vanadium | 0.032 | 0.098 |
| Zinc | 0.12 | — |
| Zicronium | 0.047 | 0.11 |

The elemental analysis shows that the process may be adjusted to control the carbon content that is retained in the gasification process. The mineral content surely depends on the type of feedstock. The composition of manure varies significantly from chickens (broiler vs. egg layer), turkeys, and horses. Biochar from horse manure is from grazing based on the high silica content. The process appears to remove significant nitrogen in the gasification process.

The leachability study took the highest fixed carbon gasified manure (6077) and oxidized the carbon away to simulate burning (oxidizing) rather than gasification. This ensured removal of carbon from the manure leaving only oxidized mineral matter. The difference between gasified and oxidized samples in their leachability should be related to fixed carbon in the gasified samples retaining or slowing the release of these minerals into the water. Since the gasified sample contained 21% carbon there will be 21% higher concentration of the minerals in the oxidized sample. The results from the leachability found that the minerals in the gasified sample were only marginally different than the oxidized sample. Again it would be expected that metals in the oxidized sample should be ~20% higher due to a more concentrated (no or less carbon) mineral being present. Total nitrogen was virtually unchanged. However phosphorous was reduced significantly when gasified which would support a slower release to plants and the environment. Chrome also showed a significant reduction when gasified. Overall the study found that gasified manure may have some benefits over oxidized manure. Additional testing using cattle manure was also conducted according to the methods described above. The gasification system has proven to effectively process a variety of fuels to produce a quality biochar product. The specific quality of the biochar is dependent on the composition of the fuel. Cow or cattle manure is one of the fuels that have been gasified and shown to produce a valuable biochar product. The quality of the biochar will vary slightly with cow manure depending on the animal diet, but can have a fairly large variation depending on the material handling methods employed on the farm where the manure is generated. Additionally, the gasification process also has some control over the quality; especially in the area of carbon content. An example of a biochar product from cow manure is shown in the mineral analysis shown in table 5.

TABLE 5

| ANALYSIS OF ASH | |
|---|---|
| Silicon dioxide | 55.36% |
| Aluminum oxide | 4.99% |
| Titanium dioxide | 0.23% |
| Iron oxide | 1.77% |
| Calcium oxide | 13.08% |
| Magnesium oxide | 3.68% |
| Potassium oxide | 8.56% |
| Sodium oxide | 3.02% |
| Sulfur trioxide | 1.42% |
| Phosphorus pentoxide | 6.78% |
| Strontium oxide | 0.04% |
| Barium oxide | 0.05% |
| Manganese oxide | 0.03% |
| Undetermined | 0.99% |
| MAA Sum | 99.01% |
| MAA Basis | Ignited s. u. |
| MAA Silicon Value | 74.92% |
| MAA Base Acid Ratio | 0.50% |
| MAA T250 | 2315° F. |
| MAA Type of Ash | LIGNITIC s. u. |
| Fouling Index | 3.02% |

What is claimed is:

1. A continuous system for gasification of a high ash biomass feedstock, wherein the high ash biomass feedstock comprises primarily farm wastes, comprising:
   a reaction zone, the reaction zone configured to receive an ash-containing biomass feedstock and including a controllable system for introducing air into the ash-containing biomass feedstock to form a char, the air being introduced at a level less than that required for complete oxidation of the ash-containing biomass feedstock, the reaction zone including a live floor having multiple augers in a side by side configuration, wherein a speed of the multiple augers is controlled to control a rate that material in the reaction zone is transferred through the reaction zone;
   a char cooling area, the char cooling area configured to receive the char from the reaction zone and having a gas capturing system for recovering gas released by the char in the char cooling area as the char cools, the char cooling area including at least one char removal auger, wherein the carbon content of the char is adjusted by varying one or more of a feed rate of the ash-containing biomass feedstock and air into the system; and
   a controller configured to adjust dwell time of the ash-containing biomass feedstock in the reaction zone and the char cooling area, and maintain a continuous process.

2. The system of claim 1, wherein air is introduced into the reaction zone at a level below that required for complete combustion.

3. The system of claim 1, further comprising a fuel conditioning zone configured to introduce the ash-containing biomass feedstock to the reaction zone, the fuel conditioning zone including a fuel dryer to preheat the ash-containing biomass feedstock prior to introduction to the reaction zone.

4. The system of claim 3, wherein the fuel conditioning zone further includes a fuel metering bin.

5. The system of claim 3, further comprising a chamber wherein the gas recovered from the char cooling area and from the reaction zone is mixed with oxidizer air and oxidized to form a resulting flue gas, wherein heat is recovered from the resulting flue gas before admission to the fuel conditioning zone.

6. The system of claim 1, wherein the gas capturing system of the char cooling area includes a gas return to direct at least a portion of the captured gas to the reaction zone.

7. The system of claim 1, wherein the ash-containing biomass feedstock is animal manure.

8. A continuous system for gasification of a high ash biomass feedstock, wherein the high ash biomass feedstock comprises primarily farm wastes, comprising:
- a fuel conditioning zone including a fuel dryer and a fuel metering bin, the fuel conditioning zone configured to pre-heat an ash-containing biomass feedstock;
- a reaction zone, the reaction zone configured to receive the ash-containing biomass feedstock from the fuel conditioning zone and including a controllable system for introducing air into the ash-containing biomass feedstock to form a char at approximately ¼ of a level required for complete oxidation of the ash-containing biomass feedstock, the reaction zone including a live floor having multiple augers in a side by side configuration, wherein a speed of the multiple augers is controlled to control a rate that material in the reaction zone is transferred through the reaction zone;
- a char cooling area, the char cooling area configured to receive the char from the reaction zone and having a gas capturing system for recovering gas released by the char in the char cooling area as the char cools, the char cooling area including at least one char removal auger, wherein the carbon content of the char is adjusted by varying one or more of a feed rate of the ash-containing biomass feedstock and air into the system; and
- a controller configured to adjust dwell time of the ash-containing biomass feedstock in the fuel conditioning zone, the reaction zone, and the char cooling area, and maintain a continuous process.

9. The system of claim 8, wherein air is introduced into the reaction zone at a level below that required for complete combustion.

10. The system of claim 8, further comprising a chamber wherein the gas recovered from the char cooling area and from the reaction zone is mixed with oxidizer air and oxidized to form a resulting flue gas, wherein heat is recovered from the resulting flue gas before admission to the fuel conditioning zone.

11. The system of claim 8, wherein the gas capturing system of the char cooling area includes a gas return to direct at least a portion of the captured gas to the reaction zone.

12. The system of claim 8, wherein the ash-containing biomass feedstock is animal manure.

13. The system of claim 8, wherein the reaction zone includes a gas outlet temperature of about 400 to 600° C.

14. The system of claim 8, further comprising a secondary chamber, wherein the gas recovered from the char cooling area and from the reaction zone is combusted in the secondary chamber.

15. The system of claim 14, wherein the secondary chamber includes a flue gas outlet temperature of about 1200° C.

* * * * *